Feb. 7, 1928.
M. LANDECK
1,658,563
ASH REMOVING GRATE FOR OVENS
Original Filed Feb. 4 1926
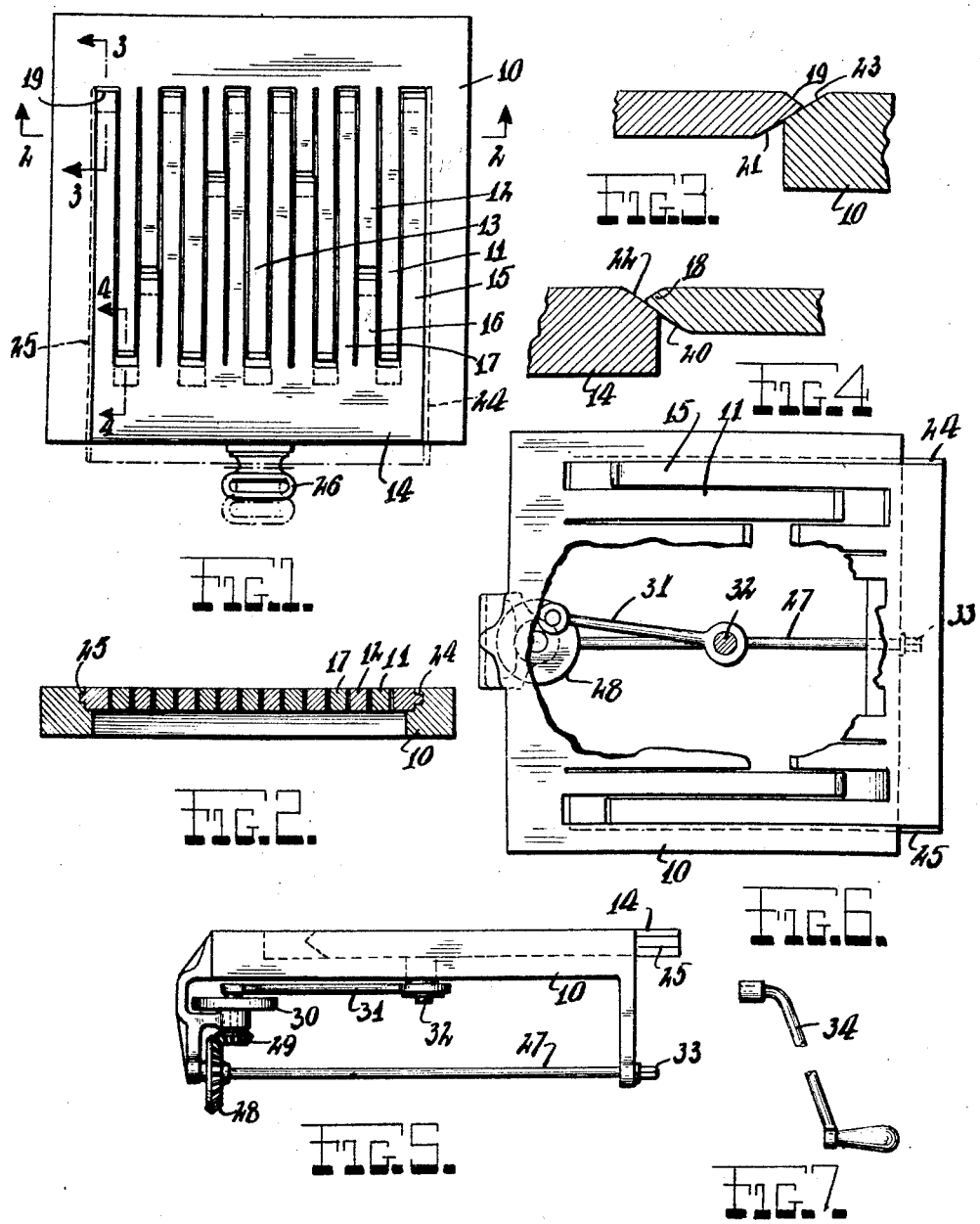
INVENTOR.
Michael Landeck
BY
ATTORNEY Patented Feb. 7, 1928.

1,658,563

UNITED STATES PATENT OFFICE.

MICHAEL LANDECK, OF BROOKLYN, NEW YORK.

ASH-REMOVING GRATE FOR OVENS.

Application filed February 4, 1926, Serial No. 85,921. Renewed December 27, 1927.

This invention relates to grates for furnaces, ovens and like heating apparatus, and its principal object is an arrangement of bars in such a way as to permit of a reciprocating motion thereof for the purpose of removal of ashes and waste material from the mass of combustible material resting thereon.

A further object is the provision of an improved means for facilitating the downward passage of said ashes, etc., from the central and intermediate portions of the grate area.

Another object is a form of bar ends especially adapted to throw aside any objects, or material which might impede their movements.

These and other objects will be described in detail in the following specification, and illustrated in the accompanying drawings, in which:

Fig. 1 shows a plan view of the grate in its simplest form; a dotted line indicates the course of its reciprocating movement.

Fig. 2 shows a vertical section on the line 2—2 of Figure 1.

Fig. 3 shows an enlarged fragmentary section on the line 3—3 of Figure 1.

Fig. 4 shows a similar view on the line 4—4 of Figure 1.

Fig. 5 shows another form of the invention with rotatable operating mechanism.

Fig. 6 shows a plan view of the device as illustrated in Figure 5, but with portion of the grate broken away to disclose the working parts.

Fig. 7 shows the crank used with the grate as shown in Figure 5.

The grate may be made of cast iron, or any suitable material. The component parts are as follows:

As shown in Fig. 1, the frame 10 comprises two parallel side members 10' and 11' and an end member 12'. A plurality of base members 11, 12, and 13 are formed integral with said end member some of which are long and some short. A reciprocating member 14, comprising an end member having formed integral therewith a plurality of bars 15, 16, and 17 which are also of various lengths, some being longer than others, is adapted to be disposed between the parallel side members of the frame 10. The long bars of the frame 10 extend to and contact with the end element of the reciprocating member 14 and the long bars of the reciprocating member 14 extend to and contact with the end element 12' of the frame 10 while the short bars of the reciprocating member 14 and the frame 10 extend to and contact with each other in the relative position of the frame 10 and the member 14 as shown in Fig. 1. It will be seen in Fig. 1 that the bars of both sections are arranged in pairs comprising one long bar and a shorter bar and that all the long bars are of the same length. At all points at which the bar ends come to rest, it will be seen that tips having short bevels as shown at 18 and 19 on top, and long under bevels as shown at 20 and 21 rest upon the bevels of the opposing members, or of the grate frame as shown at 22 and 23. This upper tip bevel is designed to lift up and thrust out of its way any particle, or material which might tend to resist its movement; the receding bevel of the opposing member further facilitates this action.

The element 14 is supported at its sides by the tongues and grooves as shown at 24 and 25. The ring handle 26 is adapted to be engaged by a poker, or like implement for the purpose of giving the reciprocating movement required for the effective operation of the grate.

In the form of the invention illustrated in Figures 5 and 6, a rotatable shaft 27 carries a bevel gear 28 which meshes with a pinion 29 and operates the cam wheel 30, to which is connected by a suitable stud the connecting rod 31, which in turn is connected by means of the stud 32 to the grate element 14. A square shouldered tip 33 is provided on the end of the shaft 27 and is adapted to fit within the socket of the crank 34. In this form of the device, the reciprocating movement is supplied by turning the shaft member as illustrated.

While I have illustrated and described my invention in its preferred forms, it is understood that minor departures in detail, or construction may be made within the limits and scope of the appended claims.

Having thus described my invention, what I claim as new and desire to secure by Letters Patent, is as follows:

1. In a device of the class described, a base frame comprising a plurality of bars formed integral with the end thereof, some of said bars being longer than others, and a reciprocating member slidably mounted in said frame comprising spaced bars formed integral with the end thereof, the bars of said reciprocating member being of different lengths and arranged relative to the bars of said frame so as to permit the long bars of the latter to extend to and contact with the end of said reciprocating member and the long bars of the reciprocating member to extend to and engage with the end of the frame, the short bars of said frame and reciprocating member being adapted to extend to and engage each other.

2. In a device of the class described, a stationary frame comprising a plurality of bars formed integral with the end of said frame, said bars being of different lengths and some of said bars being widely spaced apart relative to adjacent bars, beveled portions on the end of said frame between said widely spaced bars, beveled end tips on said bars, a reciprocating member slidably mounted in said frame comprising spaced bars formed integral with the end thereof, beveled tips on the extremities of the bars of said member, beveled portions on the end of said reciprocating member between some of the bars thereof, the bars of said reciprocating member being of different lengths and arranged relative to the bars of said frame to permit the tips of the long bars of said frame to overlap the beveled portions of the end of said reciprocating member and the beveled tips of the long bars of said reciprocating member to overlap the beveled portions of the end of said frame, the short bars of said frame and reciprocating member being adapted to overlap at their extremities.

3. In a device of the class described, a base frame comprising a plurality of bars formed integral with the end thereof, some of said bars being longer than others, a reciprocating member slidably mounted in said frame comprising spaced bars formed integral with the end thereof, the bars of said reciprocating member being of different lengths and arranged relative to the bars of said frame so as to permit the long bars of the latter to extend to and contact with the end of said reciprocating member and the long bars of the reciprocating member to extend to and engage with the end of the frame, the short bars of said frame and reciprocating member being adapted to extend to and engage each other, and means for reciprocating said reciprocating member.

4. A device of the class described comprising a stationary frame, a plurality of bars formed integral with the end member of said frame, said bars being arranged in spaced pairs comprising a long and a short bar, all of said long bars being of the same length and said short bars being of various lengths, a reciprocating member slidably mounted on said frame comprising a plurality of spaced pairs of bars, the pairs of bars of said reciprocating member comprising a long bar and a shorter bar, the long bars of all of said pairs being of an even length and the short bars thereof being of different lengths, the bars of said frame and of said reciprocating member being arranged to permit the long bars of said frame to extend to and engage the end of said reciprocating member and the long bars of said reciprocating member being adapted to engage the end of said frame, the short bars of said frame and reciprocating member being adapted to engage each other.

5. In a device of the class described, a stationary grate section comprising a plurality of bars of different lengths, a movable grate section tongue and groove mounted on said stationary section comprising a plurality of bars of different lengths, the long bars of said movable section and the long bars of said stationary section being arranged relative to each other to engage respectively the ends of said stationary section and the end of said movable section, the short bars of each of said sections being adapted to engage each other, a cam wheel mounted on said stationary section and operatively connected with said movable section, and operating mechanism comprising a crank for rotating said cam wheel.

In testimony whereof I have affixed my signature.

MICHAEL LANDECK.